UNITED STATES PATENT OFFICE.

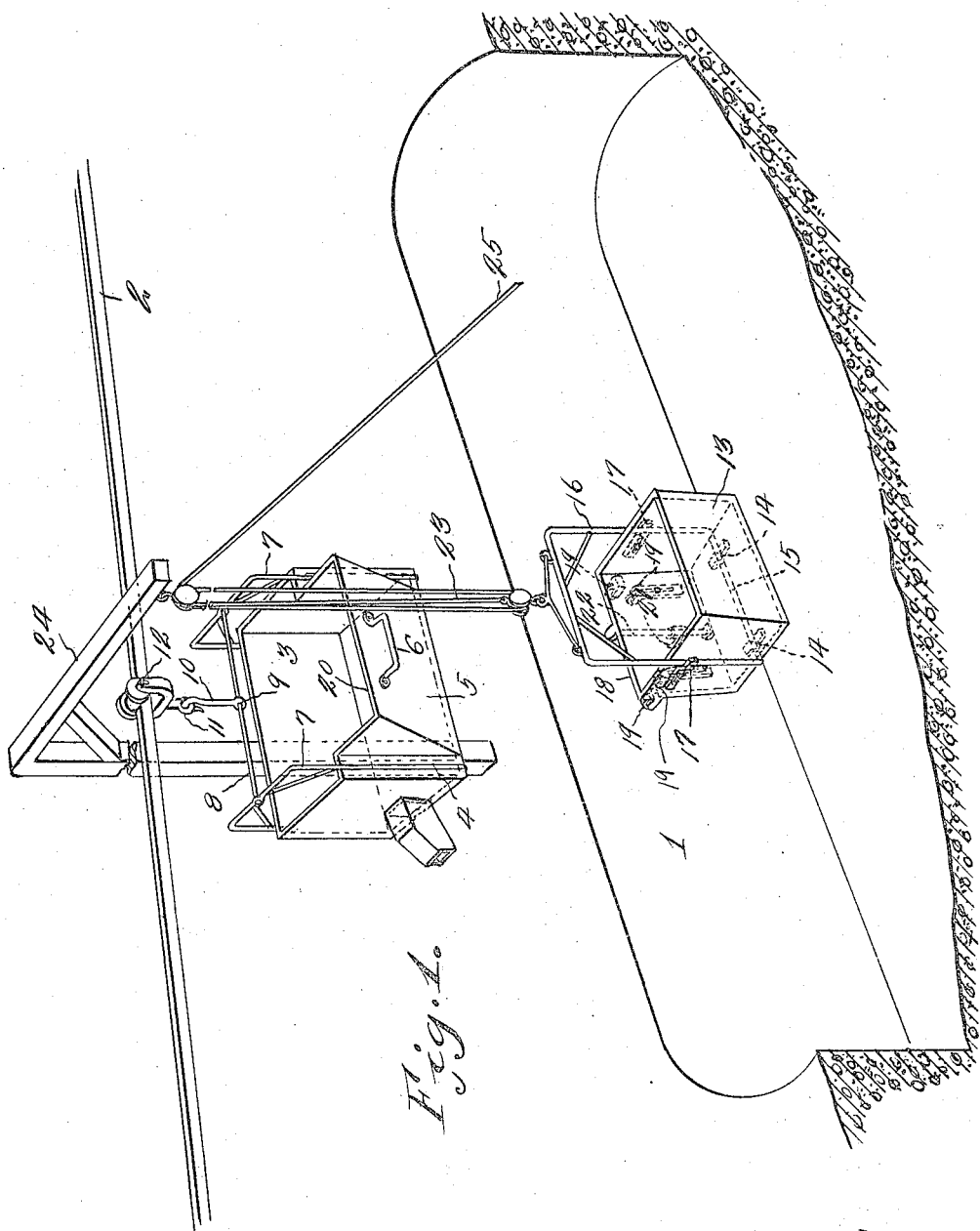

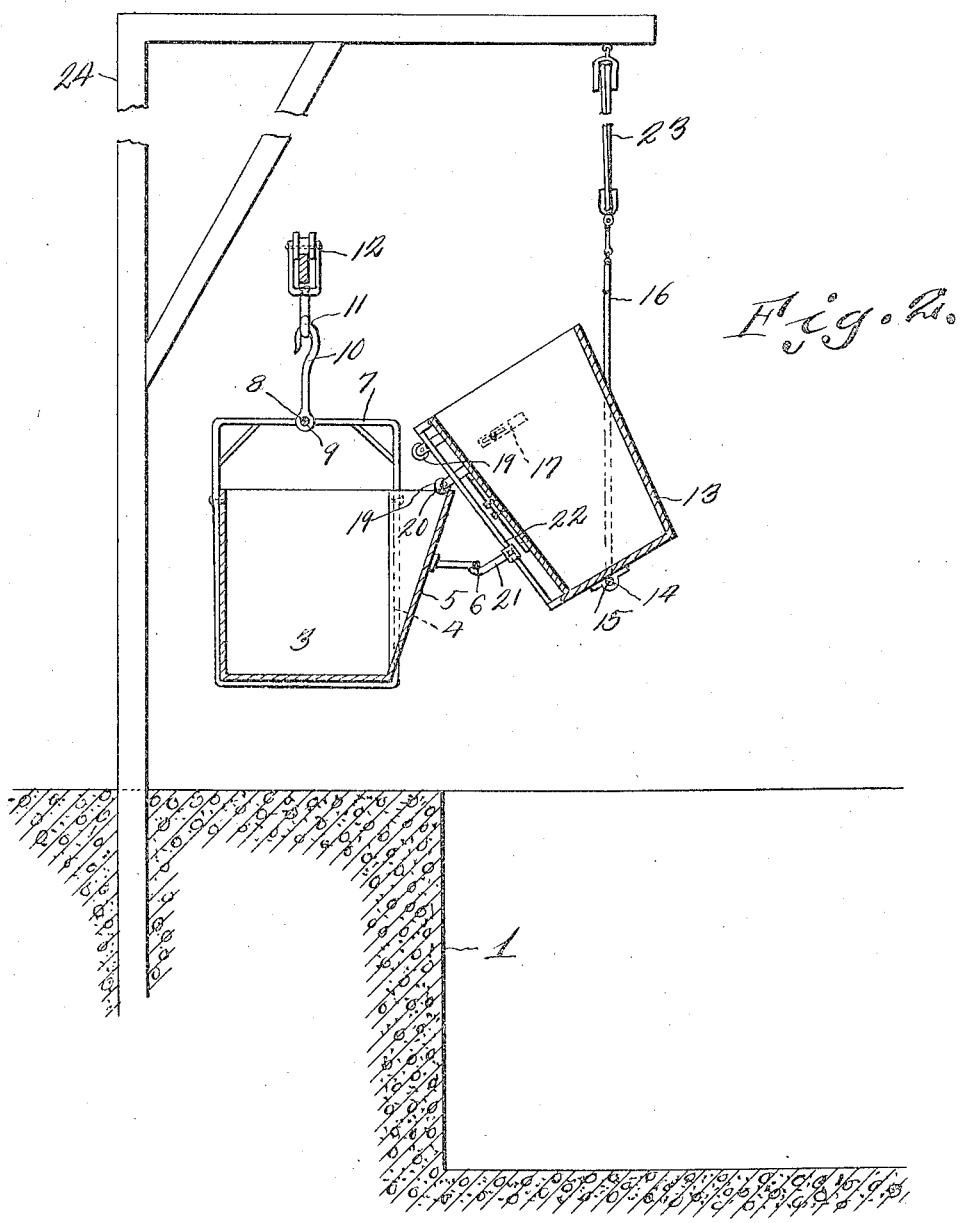

OSCAR MATTHEW, OF FORD, KANSAS.

SILO-HOIST.

1,348,435. Specification of Letters Patent. Patented Aug. 3, 1920.

Application filed June 6, 1919. Serial No. 302,317.

*To all whom it may concern:*

Be it known that I, OSCAR MATTHEW, citizen of the United States, residing at Ford, in the county of Ford and State of Kansas, have invented certain new and useful Improvements in Silo-Hoists, of which the following is a specification.

The invention relates to hoisting apparatus and particularly to a hoist whereby ensilage may be easily and quickly removed from silos of the pit type.

It is the present practice to remove the ensilage from this type of silo by getting into the silo and filling baskets, or other receptacles then lifting these heavy baskets out of the silo, after which it is necessary to climb out of the silo and distribute the feed throughout the barn. One of the principal objects of the invention is to obviate this difficulty and provide a receptacle, which receptacle may be filled, hoisted and automatically dumped into a larger receptacle, said larger receptacle after being filled being mounted on a trolley, which trolley leads into the barn so that the larger receptacle may be carried into the barn, and the ensilage therein distributed as desired.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a perspective view of the hoisting apparatus and a portion of the pit silo.

Fig. 2 is a vertical sectional view through the hoisting apparatus and a portion of the pit silo.

Referring to the drawings, the numeral 1 designates a conventional form of pit silo, which silo may be provided with any form of covering means. Extending preferably along the side of the silo and above the same is a trolley 2, which trolley may be supported in any suitable manner and may lead into a barn or shed where cattle is kept. A receptacle 3 in which ensilage is deposited is provided, this receptacle 3 is rectangular in shape and has its side 4 provided with an upward and outwardly extending chute 5, the outer face of which being provided with tripping bracket 6. One end of receptacle 3 is provided with a chute through which the ensilage may be removed from the receptacle. Each end of the receptacle 3 is provided with an arching member 7, said arching members being connected by a longitudinal rod 8. Connected to the rod 8 as at 9 is a hook 10, the upper end of which being hooked in an eye 11 of a wheeled trolley 12, which wheeled trolley is carried by the trolley 2. It will be seen that the receptacle 3 is maintained in suspended position above the ground, and that by means of the trolley 12 the receptacle 3 may be easily and quickly moved into the barn or cattle shed, this moving operation is easily accomplished by one man.

A rectangular shaped receptacle 13 is provided, which receptacle has preferably smaller capacity than the receptacle 3 and is adapted to be filled with ensilage and hoisted to a position where it will automatically dump its contents into the receptacle 3. The receptacle 13 is pivotally mounted as at 14 on the bottom bar 15 of the rectangular frame 16, the pivotal points 14 being preferably to one side of the vertical center line of the receptacle and is maintained in position within the rectangular frame 16 by its weight and limited in its pivotal action by the horizontally adjustable lugs 17, which lugs will prevent the forward pivoting of the receptacle, but will not prevent the pivoting of the same in the other direction. One side 18 of the receptacle 13 is provided with rollers 19 which rollers 19 serve to prevent the tilting of the receptacle by contact with the side of the silo as the same is being hoisted therefrom and also serves especially the bottom ones which are vertically adjustable to engage over the edge 20 of the receptacle 3, thereby insuring the proper dumping of the contents from the receptacle 13 into the receptacle 3, this dumping action being caused by the engagement of the adjustable tripping horn 21, which is vertically adjustable on the rod 22, said tripping action being caused by the tripping horn 21 coming in contact with the tripping bracket 6, when the receptacle 13 has been hoisted by means of the block and fall 23, which is supported in any suitable manner over the silo, thereby being a standard 24 shown in the drawings for illustrative purposes.

The operation is as follows. The receptacle 13 is lowered into the pit silo, then the operator gets into the pit silo and fills the receptacle 13, after which he hoists the receptacle 13 by means of the line 25, which hoisting operation causes the tripping horn 21 to come into engagement with the tripping bracket 6, which will cause the receptacle 13 to pivot inwardly so that the adjustable rollers 19 will engage over the edge 20 and the contents of said receptacle will be deposited into the larger receptacle 3, after which the receptacle 13 is further hoisted until it swings free from the receptacle 3 and is again lowered into the silo in inverted position and is placed in position for filling by the operator in the silo. The operation of filling and dumping being repeated until the receptacle 3 is filled, then the operator climbs out of the silo and moves the receptacle 3 into the barn where the contents thereof is distributed as desired.

The invention having been set forth what is claimed as new and useful is:—

1. A silo hoist comprising a suspended receptacle and a vertically movable receptacle, said suspended receptacle having a tripping bracket, the vertically movable receptacle being pivoted so as to dump, a tripping horn carried by one side of said vertically movable receptacle and so positioned as to engage the tripping bracket of the suspended receptacle when the vertically movable receptacle is moved vertically.

2. A silo hoist comprising a suspended receptacle and a vertically movable receptacle, said suspended receptacle being provided with a tripping bracket, the vertically movable receptacle being disposed in a rectangular frame, said receptacle being pivoted at its bottom to the lower rail of said frame, brackets carried by the sides of said receptacle for limiting the pivotal action of the receptacle in one direction in said frame, a tripping horn carried by one face of said receptacle and so positioned that when the receptacle is moved vertically it will engage the tripping bracket of the suspended receptacle and dump the contents of the pivoted receptacle into the suspended receptacle.

3. A silo hoist comprising a suspended receptacle and a vertically movable receptacle, said suspended receptacle being provided with a tripping bracket, the vertically movable receptacle being pivoted at its bottom to the lower rail of a rectangular frame, brackets carried by the sides of said receptacle for limiting its pivotal movement in one direction, a vertically adjustable tripping horn carried by one side of the pivoted receptacle and so positioned as to engage the tripping bracket of the suspended receptacle when the pivoted receptacle is moved vertically and rollers carried by the tripping horn side of the pivoted receptacle for preventing engagement of the tripping horn with the sides of the silo and the suspended receptacle side, the upper rollers being adapted to engage over the marginal edge of the suspended receptacle thereby insuring and preventing the open end of the pivoted receptacle from coming out of engagement with the suspended receptacle during a dumping operation.

OSCAR MATTHEW.